United States Patent
Lapicque

(10) Patent No.: US 7,079,658 B2
(45) Date of Patent: Jul. 18, 2006

(54) SYSTEM AND METHOD FOR LOCALIZATION OF SOUNDS IN THREE-DIMENSIONAL SPACE

(75) Inventor: Olivier D. Lapicque, Santa Clara, CA (US)

(73) Assignee: ATI Technologies, Inc., Toronto (CA)

( * ) Notice: Subject to any disclaimer, the term of this patent is extended or adjusted under 35 U.S.C. 154(b) by 988 days.

(21) Appl. No.: 09/881,863

(22) Filed: Jun. 14, 2001

(65) Prior Publication Data
US 2002/0196947 A1 Dec. 26, 2002

(51) Int. Cl.
*H04R 5/00* (2006.01)
(52) U.S. Cl. .............................. 381/17; 381/1
(58) Field of Classification Search .................. 381/18, 381/17, 300, 307, 98, 103, 23, 1
See application file for complete search history.

(56) References Cited

U.S. PATENT DOCUMENTS

| 5,450,312 | A | * | 9/1995 | Lee et al. ................... 381/103 |
| 5,987,142 | A | * | 11/1999 | Courneau et al. ............. 381/17 |
| 6,011,851 | A | * | 1/2000 | Connor et al. ................ 381/17 |
| 6,343,130 | B1 | * | 1/2002 | Yamazaki ................... 381/309 |
| 6,643,674 | B1 | * | 11/2003 | Kamiya et al. ............. 708/300 |

* cited by examiner

Primary Examiner—Brian Tyrone Pendleton

(57) ABSTRACT

A system and method for localization of sounds in 3-D space using Head Related Transfer Functions (HRTFs) are disclosed herein. A plurality of audio signals and/or sound sources, or "voices", represented by data, such as one or more audio files or streaming audio data, is transmitted from an audio source, such as a compact disc player, to an audio processing system. The audio processing system, in one embodiment, prioritizes the voices based on characteristics of the voices, such as the relative listening benefit of sound localization of a particular voice. In one embodiment, a finite impulse response (FIR) filter is used to apply a HRTF to the voices. The audio processing system distributes up to a fixed number of coefficients among the voices, where the distribution of the coefficients, in one embodiment, is based on the priority of each channel. Those voices having a higher priority than other voices could have a greater number of coefficients assigned to them than the lower priority voices. The voices, in one embodiment, are processed by the FIR filter using the assigned number of coefficients for each voice. The results of the FIR filter can then be further processed, if needed, and output to a set of speakers, a storage device, and the like. By distributing a fixed number of coefficients among the plurality of voices, a dynamic tradeoff between sound localization quality and processing effort and/or time can be achieved based on the voices' priorities.

38 Claims, 5 Drawing Sheets

SYSTEM AND METHOD FOR LOCALIZATION OF SOUNDS IN THREE-DIMENSIONAL SPACE

FIELD OF THE DISCLOSURE

The present invention relates generally to processing audio signals and more particularly to the localization of sounds in three-dimensional space.

BACKGROUND

A common method for localization of a sound in three-dimensional (3-D) space is to apply a Head Related Transfer Function (HRTF) to the data representative of the sound. However, HRTFs are commonly implemented using long finite impulse response (FIR) filters, which are costly in the terms of memory and processing effort and/or time. This cost is further exacerbated when a HRTF is applied to a plurality of sound sources, or "voices". For example, if 32 stereo voices having a sample rate of 44.1 kHz are to be processed using a HRTF with 32 coefficients, a total of 90,316,800 samples (44.1 kHz * 2 channels/voice * 32 voices * 32 coefficients) must be processed per second, a rate that could severely tax many audio processing systems.

To avoid the difficulties inherent with common methods of using long FIR filters to apply a HRTF, methods using shorter infinite impulse response (IIR) filters to implement a HRTF have been developed. However, IIR filters introduce other difficulties. One difficulty common to this solution is that the shorter IIR filters often produce sound localization results of insufficient quality or precision. Another difficulty is that IIR filters are generally much less stable than FIR filters, especially during transitions between sets of coefficients. In order to avoid instability in IIR filters, the precision of the IIR filter must be increased, thereby reducing or eliminating the lower processing effort benefit of a short IIR filter over a long FIR filter.

Given these limitations, as discussed, it is apparent that a more efficient method and/or system for localization of sounds in three-dimensional space would be advantageous.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

In accordance with at least one embodiment of the present invention, a first voice data having a first characteristic is received. Additionally, a second voice data having a second characteristic is received. A first number of coefficients is assigned to the first voice data based on the first characteristic. A second number of coefficients is assigned to the second voice based on the second characteristic. One advantage in accordance with a specific embodiment of the present invention is that fewer resources are needed to implement a Head Related Transfer Function. Another advantage is that less processing effort is needed to implement a Head Related Transfer Function.

FIGS. 1–5 illustrate a system for localization of sounds in three-dimensional (3D) space using Head Related Transfer Functions (HRTFs), as well as a method for its use. A plurality of sound sources, or "voices", represented by an audio channel, such as one or more audio files or streaming audio data, is transmitted from an audio source, such as an compact disc player, to an audio processing system. The audio processing system, in one embodiment, prioritizes the voices based on characteristics of the voices, such as an audio type (monaural, binaural, stereo, 3-D, etc.), the relative listening benefit of sound localization of a particular voice, and the like. In one embodiment, a finite impulse response (FIR) filter is used to apply a HRTF to the voices. The audio processing system distributes a fixed number of coefficients among the voices, wherein the distribution of the coefficients, in one embodiment, is based on the priority of each channel. For example, if the fixed number of coefficients is equal to thirty-two and there exist four voices with equal priority, each voice could get eight coefficients. Similarly, those voices having a higher priority than other voices could have a greater number of coefficients assigned to them than the lower priority voices. The voices, in one embodiment, are processed by the FIR filter using the assigned number of coefficients for each voice. The results of the FIR filter can then be further processed, if needed, and output to a set of speakers, a storage device, and the like. By distributing a fixed number of coefficients among the plurality of voices, a dynamic tradeoff between sound localization quality and processing effort and/or time can be achieved based on the voices' priorities.

Figure 1:
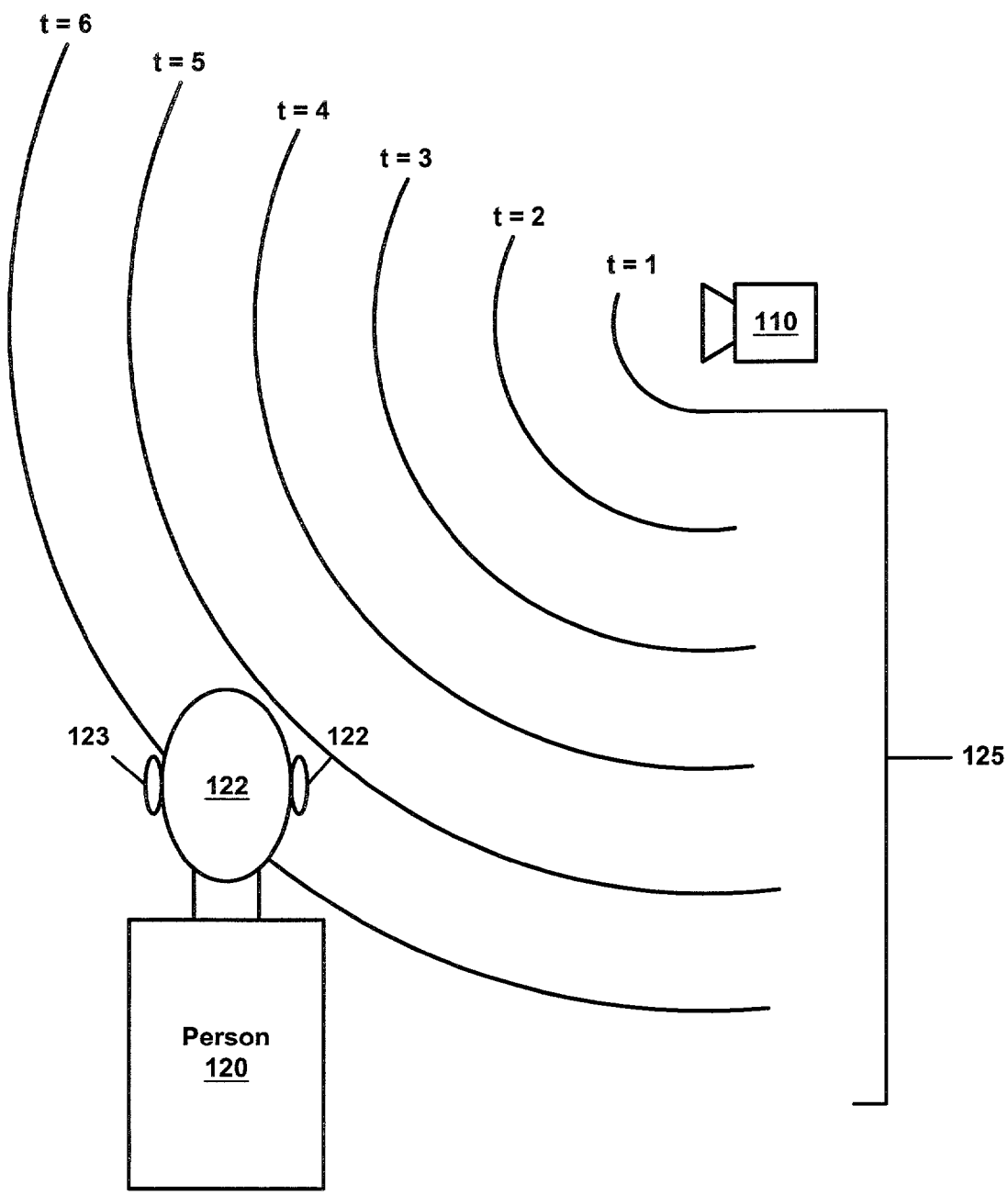
FIG. 1 is a diagram illustrating the interaction of sound emitted from a sound source with the human auditory system according to at least one embodiment of the present invention.

Referring now to FIG. 1, an interaction of sound emitted from a sound source with the human auditory system is illustrated according to at least one embodiment of the present invention. Generally, there are four audio types or formats used for recording sound emitted from a sound source (sound source 110): monaural; stereo; binaural; and three-dimensional (3-D) audio. Monaural recordings are normally generated using one microphone to record sound 125. With only one point of reference (the single microphone), it is often difficult to generate a sense of the location of the sound source with a monaural recording without additional information. Similarly, by using two (or more) microphones with different positions, stereo sound recordings may be generated. Since multiple points of reference (the plurality of microphones) are used, some form of sound localization is possible when the separate channels are output through a plurality of speakers. However, stereo recordings generally have relatively poor sound localization when interpreted by the human auditory system. For example, when stereo audio data is output to a pair of headphones, a listener, such as person 120 often perceives sound 125 coming from within the listener's head 122. To get around this undesirable effect, binaural recordings of sound source 110 may be used, wherein one microphone is embedded in each of the left and right ear of a mannequin head. Binaural recordings more accurately represent what the human auditory system would hear as the mannequin head filters sound in a manner similar to the human head. Taking the idea of binaural recordings one step further, 3-D sound recording includes taking a recording of sound 125 from sound source 110 with small microphones embedded in the ears of an actual person. In this manner, 3-D sound recording, in general, most accurately represents how the human auditory system would perceive the sound emitted from sound source 110.

Although sound recordings using microphones embedded in the ears of an actual person often generates highly accurate recordings, it is often impractical to do so. For example, a computer game may utilize a variety of sounds associated with objects in the game. Since the computer game uses a simulated environment, it would be difficult to record all possible sounds using typical 3-D sound recording methods. Accordingly, a number of methods have been developed to simulate the human auditory systems interaction with sounds in 3-D space. One common method is to use a Head Related Transfer Function (HRTF) to simulate the human auditory system. HRTFs can be developed for a particular person's auditory system, or for an "average" person. An HRTF often includes a linear function that is based on the sound source's position and takes into account many of characteristics of the sound's interaction with the human auditory system that can be used to localize sounds, such as inter-aural time delays, head shadow, pinna response, shoulder echo, etc. A HRTF is used to develop pairs of filters for specific sound positions using these interactions. Each sound position requires two filters, one for right ear 122 and one for left ear 123. These filters normally include finite impulse response (FIR) filters, each filter using a certain set of coefficients. After passing a sound recording (monaural, stereo, or binaural) through each filter, the resulting output channel can be accurately perceived by the human auditory system as having a virtual location in 3-D space.

Figure 2:
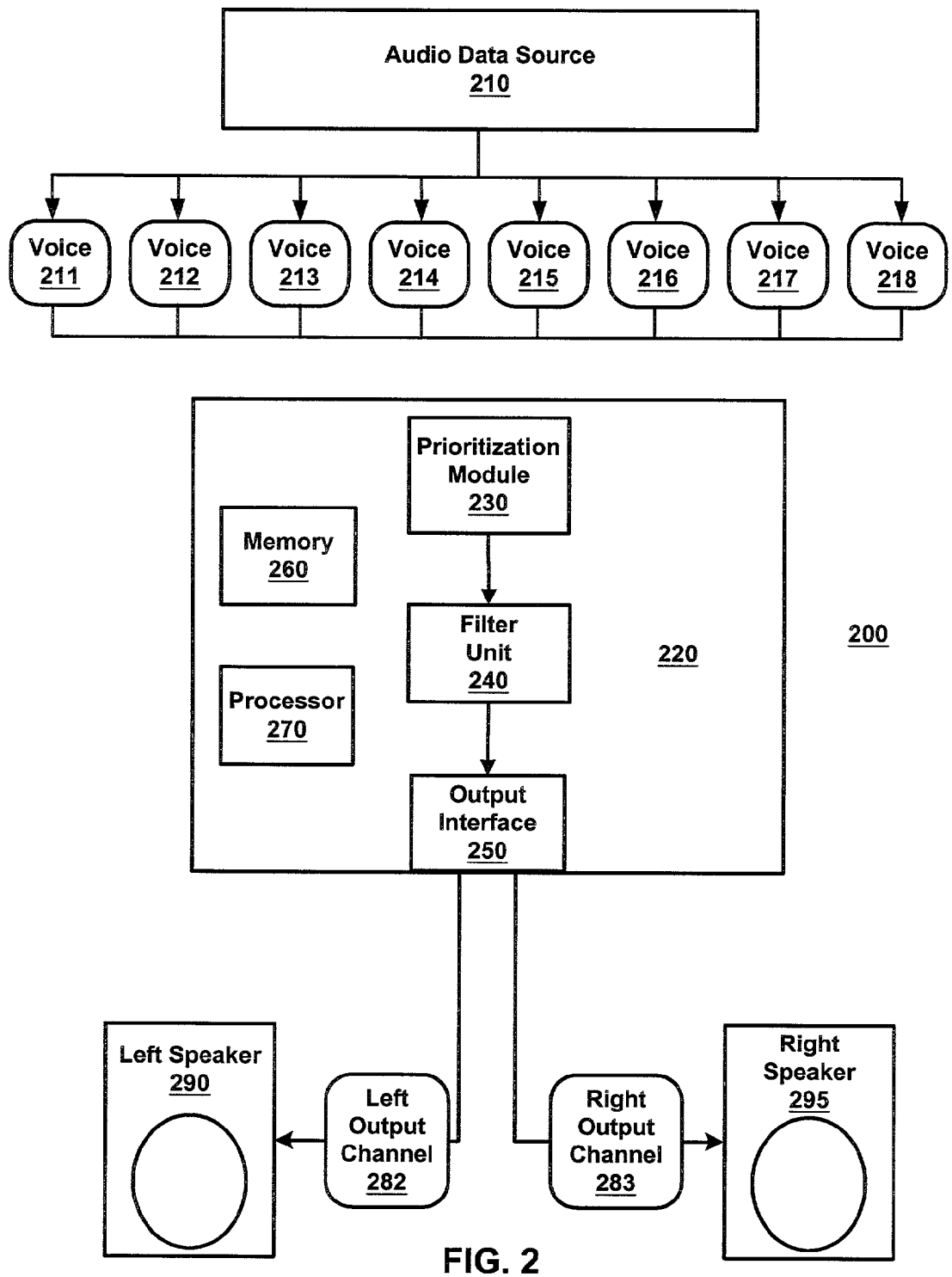
FIG. 2 is a block diagram illustrating a sound localization system according to at least one embodiment of the present invention.

Referring now to FIG. 2, a 3-D sound localization system utilizing a Head Related Transfer Function is illustrated according to at least one embodiment of the present invention. Sound localization system 200 includes audio data source 210, audio processing system 220, left speaker 290, and right speaker 295. Audio processing system 200 includes prioritization module 230, filter unit 240, and output interface 250. Audio processing system 200 can further include memory 260 and processor 270. Sound localization system 200, in whole or in part, can be implemented using software or hardware, or a combination thereof. For example, audio processing system 220 could be incorporated as part of a graphics chip, a sound card for a computer, an application specific integrated circuit (ASIC), combinational logic, and the like. Likewise, some elements of audio processing system 220 could be implemented as software. For example, the functions of prioritization module 230 and filter unit 240 could be implemented as a set of instructions stored in memory 260 and executed by processor 270. Memory 260 can include random access memory (RAM), a hard disk, an optical disc, cache, flash memory, and the like. Processor 270 can include a microcontroller, a microprocessor, an integrated circuit, combinational logic, etc.

In at least one embodiment, audio data source 210 transmits audio data representative of one or more audio signals or sound sources to audio processing system 220. The audio data can include stereo audio data, mono audio data, and the like. Audio data source 210 can include any number of types of audio sources or players, such as a compact disc player or an Motion Picture Experts Group Layer 3 (MP3) player, streaming audio data transmitted over the Internet or other network, and the like. In at least one embodiment, audio data transmitted from audio data source 210 is transmitted to audio processing system 220 in the form of a plurality of voices, such as voices 211–218, wherein each voice represents a specific audio channel, sound source, or portion of the audio data. For example, the audio data transmitted from audio data source 210 could include the soundtrack of a movie, where voice 211 could represent an audio channel associated with one actor's speech, voice 212 could represent an audio channel associated with a second actor's speech, and voices 213–218 could represent various background noises, such as background music, wind noise, etc. Alternatively, each voice could represent audio data associated with a final output device or speaker. For example, voice 211 could be associated with a front speaker of a home theater system, voices 212–213 could be associated with a right speaker, voices 214–215 associated with a left speaker, and voices 216–218 with a rear speaker.

Audio processing system 220, in one embodiment, receives voices 211–218 from audio data source 210 for sound localization processing. Prioritization module 230, in one embodiment, sort voices 211–218 according to a predetermined priority strategy. In one embodiment, voices 211–218 are prioritized based on an interpreted distance between a "sound source", represented by each of voices 211–218, and the listener. For example, if voice 211 is representative of a sound source that is interpreted by the listener as being two feet from the listener while voice 212 represents a sound source that is interpreted as being twenty feet from the listener, voice 211 could have a higher priority than voice 212 since voice 211 is "closer". Similarly, voices 211–218, in one embodiment, are prioritized based on when each of voices 211–218 are to be heard by a listener. Those voices 211–218 that are heard before others are given a higher priority. In another embodiment, voices 211–218 are prioritized by a volume associated with each of voices 211–218.

In addition to prioritizing voices 211–218 based on interpreted distance or time characteristics, voices 211–218, in one embodiment, are prioritized based on audio type. For example, in one embodiment, those voices of voices 211–218 that are representative of a 3-D audio type voice may have the highest priority, followed by those of voices 211–218 that are of a two-dimensional (2-D) audio type, followed by monoaural voices, and so on. For example, using the previous example of a computer game, those voices coming from objects within the computer game having a specific location within the virtual environment of the computer game could have a high priority, since they generally have the most need for 3-D sound localization. Similarly, objects having an indeterminate location in the computer game, such as background music could have a medium priority. Those sound that are monoaural in nature, such as a warning bell indicating limited remaining game play time, could have a low priority. The priority strategy utilized by prioritization module 230 can be determined by a user of audio processing system 200, preset based on the type of audio data transmitted from audio data source 210, empirically determined for desired functionality, and the like. In at least one embodiment, more than one prioritization strategy can be implemented simultaneously. Prioritization module 230, in one embodiment, is implemented as a set of executable instructions stored in memory 260 and executed by processor 270.

Note that, in at least one embodiment, each of voices 211–218 has already been assigned a priority before being sent to audio processing system 220. For example, data could be sent by audio data source 210 with each of voices 211–218 indicating a predetermined priority value or level. Alternately, the prioritization of voices 211–218 could be indicated by the channel that each voice is transmitted on from audio data source 210 to audio processing system 220. For example, audio processing system 220 could input voices 211–218 on eight input channels, channel 0—channel 7, with channel 0 being the highest priority channel and channel 7 being the lowest priority channel. In this example, audio data source 210 could place each of voices 211–218 on one of the eight input channels depending on a priority associated with each voice. Other methods of predetermining a prioritization scheme for voices 211–218 may be used without departing from the spirit or the scope of the present invention.

After being prioritized by prioritization module 230 voices 211–218 can be transmitted to filter unit 240, where one or more HRTFs can be applied to voices 211–218. Filter unit 240, in one embodiment, utilizes one or more finite impulse response (FIR) filters to implement a HRTF. In at least one embodiment, filter unit 240 distributes N coefficients among voices 211–218, where N is a fixed number. The N coefficients can be distributed based on a priority scheme, distributed evenly, etc. As a result of sharing the fixed number (N) of coefficients among a plurality of voices 211–218, filter block 240, in one embodiment, can more efficiently and/or quickly filter voices 211–218 with minimal attenuation in precision or quality. As a result of the application of a HRTF to voices 211–218 using filter unit 240, in at least one embodiment, a form of sound localization can be efficiently generated for some or all of voices 211–218. Filter unit 240 is discussed in greater detail subsequently with reference to FIG. 3.

After filter unit 240 processes some or all of voices 211–218, the output is sent to output interface 250 where any desired additional processing of voices 211–218 can be performed. For example, output interface 250 can perform a sample rate conversion, amplitude attenuation, equalization, etc. In at least one embodiment, voices 211–218 output from filter unit 240 are combined and output. For example, data from voices 211–218 associated with a left channel can be combined and output to left speaker 290 as left output channel 282 in an analog format. Similarly, in this example, data from voices 211–218 associated with a right channel can be combined and output to right speaker 295 as right output channel 283. Alternately, in one embodiment, the output from output interface 250 is stored in an appropriate format on a storage device, such as a compact disc or hard disk.

Figure 3:
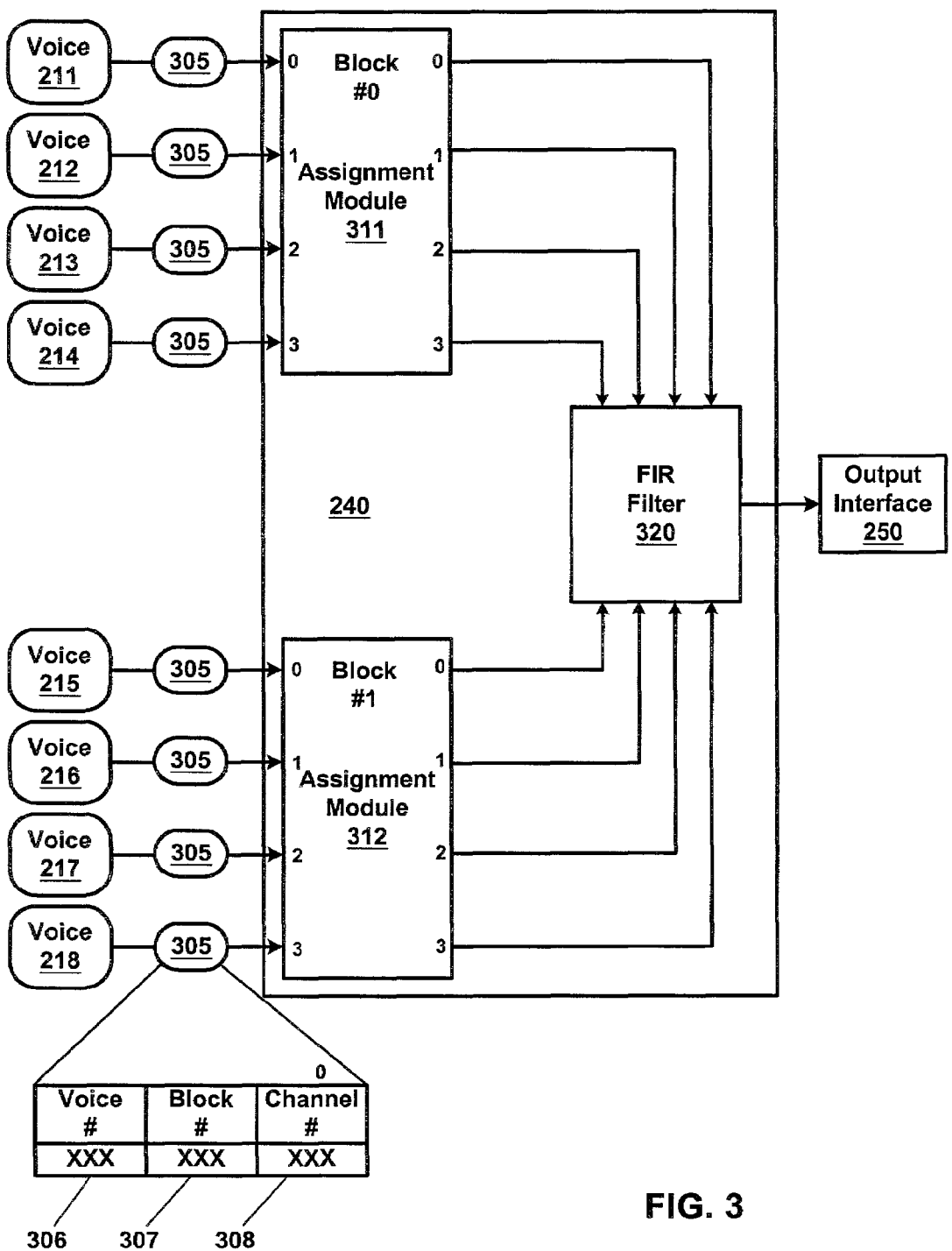
FIG. 3 is a block diagram illustrating a filter unit implemented by the sound localization system of FIG. 2 according to at least one embodiment of the present invention.

Referring next to FIG. 3, filter unit 240 is illustrated in greater detail according to at least one embodiment of the present invention. As discussed previously, in at least one embodiment, a fixed number (N) of coefficients are distributed among voices 211–218 by filter unit 240. In the example implementation of filter unit 240 illustrated in FIG. 3, two assignment modules (assignment modules 311, 312) are used to distribute the N coefficients among voices 211–218. In this example, each assignment module 311, 312 has four channel inputs, each channel input corresponding to one of voice 211–218. Assignment module 311, as illustrated, has voices 211–214 input into channel inputs 0–3 of block 0, respectively. Similarly, assignment module 312 (block #1) has voices 215–218 as channel inputs 0–3 of block 1.

In at least one embodiment, the routing of voices 211–218 to their assignment modules 311, 312 and channel input is carried out by prioritization module 230 (FIG. 2). For example, prioritization module 230 could associate an identifier, such as identifier 305, with each voice 211–218. Identifier 305 could include a voice number identification value 306, a block number 307 corresponding to one of the assignment modules 311, 312, and a channel input number 308 corresponding to one of the channel inputs 0–3 of assignment modules 311 and 312. It will be appreciated that although filter unit 240 is illustrated in FIG. 3 as having two assignment modules (assignment modules 311, 312) each having four channel inputs (channel inputs 0–4), other combinations of the number of assignment modules, channel inputs, and the like can be implemented without departing from the spirit or the scope of the present invention. For example, in one embodiment, filter unit 240 includes 8 assignment modules (assignment modules 311, 312), each assignment module having four channel inputs, resulting in filter unit 240 having the capability of processing 32 voices (voices 211–218). In other embodiments, assignment modules 311, 312 can have more or fewer than four channel inputs. Additionally, different assignment modules can have different numbers of channel inputs.

Assignment modules 311, 312, in one embodiment, distribute a certain number of coefficients of a HRTF among the voices (voices 211–218) input through channel inputs 0–3. For example, if filter unit 240 has sixty-four coefficients available (N=64) equally divided between two assignment modules, assignment modules 311 and 312 in this case, and having four channel inputs, each assignment module can distribute thirty-two coefficients between four voices (voices 211–218). These thirty-two coefficients can be distributed between the four voices based on priority, equally distributed, and the like, as previously discussed. The distribution of coefficients is discussed in greater detail subsequently.

In one embodiment, after assignment modules 311, 312 assign coefficients to each of voices 211–218, each voice is in turn processed by FIR filter 320, resulting in the application of a Head Related Transfer Function to each of voices 211–218. FIR filter 320 can be implemented in hardware or software. For example, in one embodiment, FIR filter 320 is implemented as a set of instructions stored in memory 260 (FIG. 2) and executed by processor 270 (FIG. 2). Alternately, FIR filter 320 can be implemented as dedicated hardware, such as an ASIC. Note that although a single FIR filter 320 is illustrated as processing all of voices 211–218, in other embodiments a plurality of FIR filters 320 may be used to process voices 211–218. For example, filter unit 240 may implement a FIR filter 320 for each assignment module 311, 312. Likewise, filter unit 240 could implement multiple FIR filters 320 for each assignment module 311, 312, for example, to handle one of two stereo channels associated with each voice 211–218. Filter unit 240 could also implement one FIR filter 320 for each voice 211–218, etc. FIR filter 320 is discussed in greater detail subsequently with reference to FIG. 4. The results of FIR filter 320 are output to output interface 250, whose functions were described previously.

Figure 4:
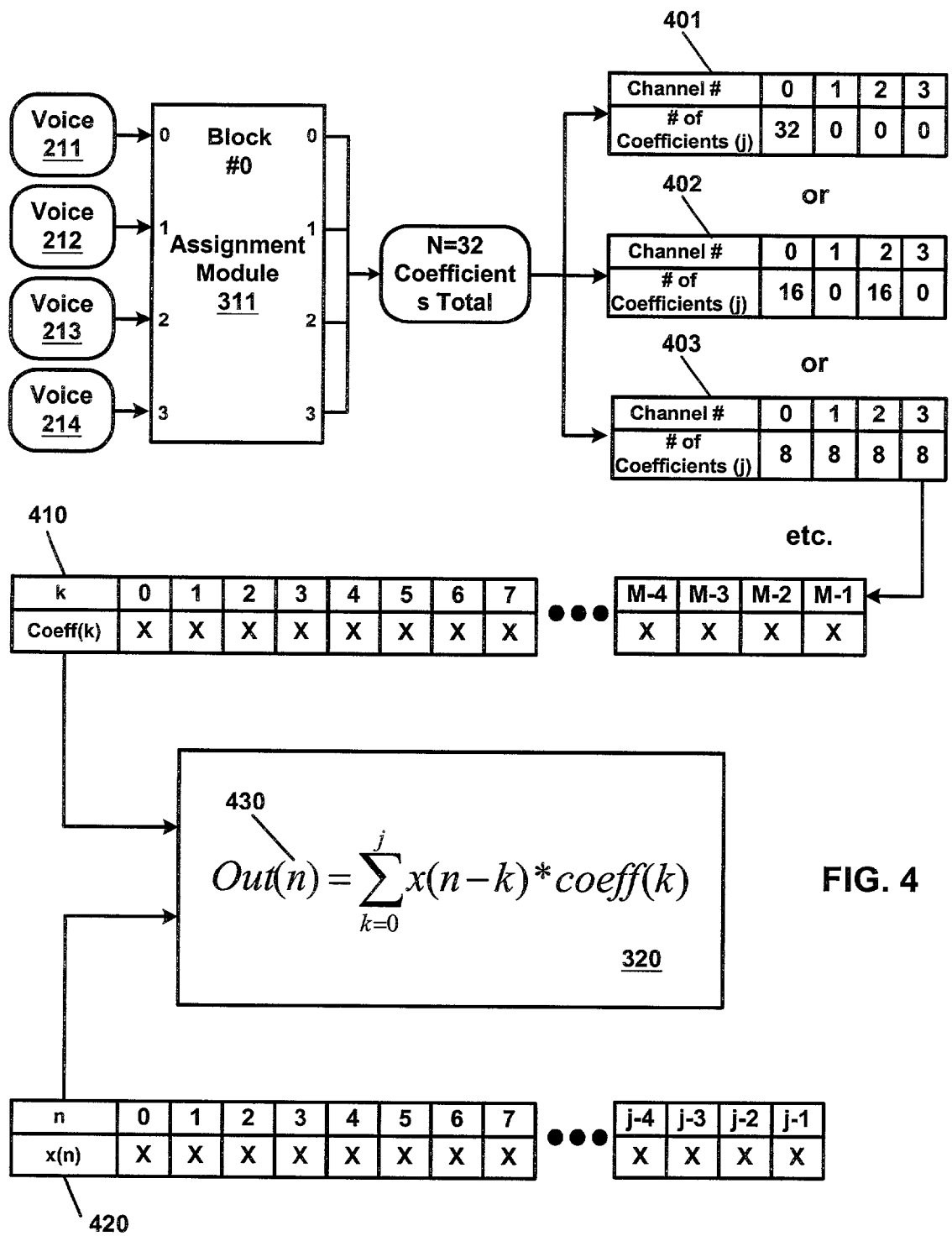
FIG. 4 is a block diagram illustrating a finite impulse response filter for implementation of a Head Related Transfer Function according to at least one embodiment of the present invention.

Referring now to FIG. 4, a method for applying an HRTF to a voice based on the number of coefficients of FIR assigned to the voice is illustrated according to at least one embodiment of the present invention. As discussed previously, in at least one embodiment, a fixed number of coefficients associated with an implementation of an HRTF are distributed by one or more assignment modules 311 (FIG. 3) among a plurality of voices 211–218 (FIG. 2). For example, assignment module 311, as illustrated, includes four channel inputs (0–4) associated with voices 211–214, respectively. In this example, assignment module 311 can distribute up to thirty-two coefficients (i.e. N=32) among the four voices 211–214 based on a priority scheme, equal distribution, and the like. In at least one embodiment, the number of coefficients assigned to a particular voice (voices 211–218) effects the precision, accuracy and/or amount of processing required when applying a Head Related Transfer Function. For example, in one embodiment, the greater the number of coefficients used when applying a Head Related Transfer Function, the greater the resulting precision. Accordingly, in at least one embodiment, the precision to which the sound localization is determined for each of voices 211–218 (via the application of a HRTF) is directly proportional to the number of coefficients assigned to each voice.

Distribution scheme 401 illustrates a priority based distribution scheme based on a distribution of thirty-two coefficients. As discussed previously, in one embodiment, prioritization module 230 prioritizes voices 211–218 (FIG. 2) based on characteristics or properties of each of the voices, such as audio type (monaural, binaural, stereo, etc.), the amount of data associated with a voice, etc. As illustrated by distribution scheme 401, voice 211 associated with channel input 0 of assignment module 311 is assigned all thirty-two coefficients, whereas the voices associated with channel inputs 1–3 are not assigned any coefficients. One example of where distribution scheme 401 may be used is in a home theater system. Voices 211–214 could be prioritized based on the interpreted distance of the sounds represented by voices 211–214. For example, voice 211 could include sound content that is interpreted by the auditory system of a listener as coming from two feet away, whereas voices 212–214 could include sound content that interpreted by the listener as being very far away. Therefore, distribution scheme 401 distributes all thirty-two coefficients to voice 211, and none to the remaining voices 212–214. In at least one embodiment, those of voices 211–214 having no coefficients assigned sent in an unfiltered form to output interface 250.

Distribution scheme 402 includes an example of an equal distribution of thirty-two coefficients between two of the four voices. In this example, assignment module 311, using distribution scheme 402, could distribute sixteen coefficients to channel input 0 (voice 211) and 16 coefficients to channel input 2 (voice 213). Using the previous home theater example, channel inputs 0 and 2 could be designated as high priority (i.e. could benefit the most from application of a HRTF), while channel inputs 1 and 3 could be designated as low priority (i.e. could benefit less). Alternately, in distribution scheme 403, thirty-two coefficients are distributed equally among channel inputs 0–3 (voices 211–214).

Note that although three distribution schemes (distribution schemes 401–403) have been illustrated, any number of distribution schemes may be implemented, as appropriate, by assignment module 311. For example, assignment module 311 can distribute fewer coefficients than it has assigned, such as only distributing twenty-for of thirty-two coefficients among voices 211–214. In another example, if prioritization module 230 (FIG. 2) and/or assignment module 311 determine that none of voices 211–214 would benefit (i.e. generate sound localization) from application of a HRTF, assignment module 311 could assign zero coefficients to each of voices 211–214. Similarly, in at least one embodiment, the number of coefficients available for assignment module 311 to distribute can change. For example, if there is a plurality of assignment modules 311 utilized by filter unit 240 having N coefficients, those N coefficients can be distributed dynamically among the multiple assignment modules 311. In this case, if one assignment module 311 of the plurality of assignment modules 311 does not assign all of its coefficients among those of voices 211–218 assigned to it, the remaining coefficients could be redistributed to another assignment module 311 for distribution to assigned voices of the other assignment module 311.

As discussed previously, in at least one embodiment, filter unit 240 applies a HRTF to voices 211–214 via processing of voices 211–214 by FIR filter 320. Voices 211–214, each in turn, are transmitted to FIR filter 320 for filtering using a number of coefficients assigned to each voice 211–214. In at least one embodiment, FIR filter 320 implements the following equation 430:

$$Out(n) = \sum_{k=0}^{j} x(n-k) * coeff(k)$$

where n represents the nth datum of the voice being processed, $x(n)$ represents the value of the nth datum, $coeff(k)$ represents the value of the kth coefficient, j represents the number of coefficients assigned to the voice being processed, and $Out(n)$ represents the sum of the sum of the product of $x(n-k)$ and $coeff(k)$ for the values of k=0 to k=j. Equation 430 may be implemented as a set of instructions of a software program, implemented in hardware, such as an ASIC or combinational logic, a combination thereof, etc.

In at least one embodiment, the values for $coeff(k)$ are stored in coefficient look-up table 410 and are indexed by k=0 to M−1 (where M represent the number of coefficients associated with FIR filter 320 as an implementation of a HRTF). Coefficient look-up table 410 can be hard coded, or implemented in memory 260 (FIG. 2), registers, cache, modular memory, and the like. It will be appreciated that the coefficient values used by FIR filter 320 may be obtained in a variety of ways. For example, coefficient values for a "typical" human head are easily obtainable from outside sources, such as research centers or software vendors. Alternately, if a customized set of coefficients for a certain person's head are desired, the coefficients may be obtained by modeling the certain person's head, such as by applying an impulse sound and determining the coefficients from the results, a common method known to those skilled in the art. Additionally, a set of coefficients could be selected from multiple sets of coefficients by a user, a set of coefficients could be provided by an application, and the like.

FIR filter 320, in one embodiment, uses coefficient look-up table 410 and the data values $x(\ )$ associated with a voice (represented by voice data set 420) to apply equation 430 for the given number of coefficients j for each datum of voice data set 420. For example, using distribution scheme 402, voice 211 and voice 213 are each processed according to equation 430 using the first 16 coefficients, i.e. coeff(0) through coeff(15), while voices 212, 214 are not processed by FIR filter 320. In another example, using distribution scheme 401, voice 211 is processed according to equation 430 using all 32 coefficients, i.e. coeff(0) through coeff(31), while the remaining voices 212–214 are unaltered by FIR filter 320. In one embodiment, voices (voices 211–218, FIG. 2) having zero assigned coefficients are passed unchanged from filter unit 240 (FIG. 2) to output interface 250 (FIG. 2).

It will be appreciated that, in general, the more coefficients used by a FIR filter (FIR filter 320) in the process of applying a HRTF to audio data, the more accurate the resulting 3-D sound localization of the audio data is. However, as more coefficients are used, more processing effort is typically required. As a result, there normally is a trade-off between precision (i.e. number of coefficients used) and processing time/effort. Since it is often the case that multiple voices are being processed simultaneously, in one embodiment, it is acceptable to sacrifice some precision in exchange for faster processing, since it is difficult for the human auditory system to localize a specific sound source from multiple sound sources.

In general, the coefficients associated with the more recent or closer data being processed by a FIR filter (FIR filter 320) are more relevant than the coefficients associated with the less recent data processed. Accordingly, it is often desirable to use the coefficients associated with more recent data before using less recent coefficients. Accordingly, in at least one embodiment, the "assigned" or "distributed" coefficients associated with one voice (voices 211–218) are not necessarily mutually exclusive of the "assigned" or "distributed" coefficients associated with another voice. In other words, the number of coefficients (N) to be distributed among voices by assignment module 311 is not related to the number of coefficients (M) available in coefficient look-up table 410 and/or FIR filter 320. For example, if the number of coefficients to be distributed (N) is coincidentally equal to the number of coefficients (M) available in coefficient look-up table 410, the distribution of eight coefficients to each of voices 211–214 doesn't necessarily mean that voice 211 is assigned the first set of 8 of the M coefficients, voice 212 is assigned the second set of 8 of the M coefficients, and so on. In one embodiment, each voice is assigned its number of coefficients (j) starting from the most recent coefficient (coeff(0)) and going on to the jth coefficient (coeff(j−1)). For example, using distribution scheme 403 where each of voices 211–214 are assigned eight coefficients, each of voices 211–214, in this example, are assigned the same coefficients, i.e. coeff(0) through coeff(7) of coefficient look-up table 410.

Figure 5:
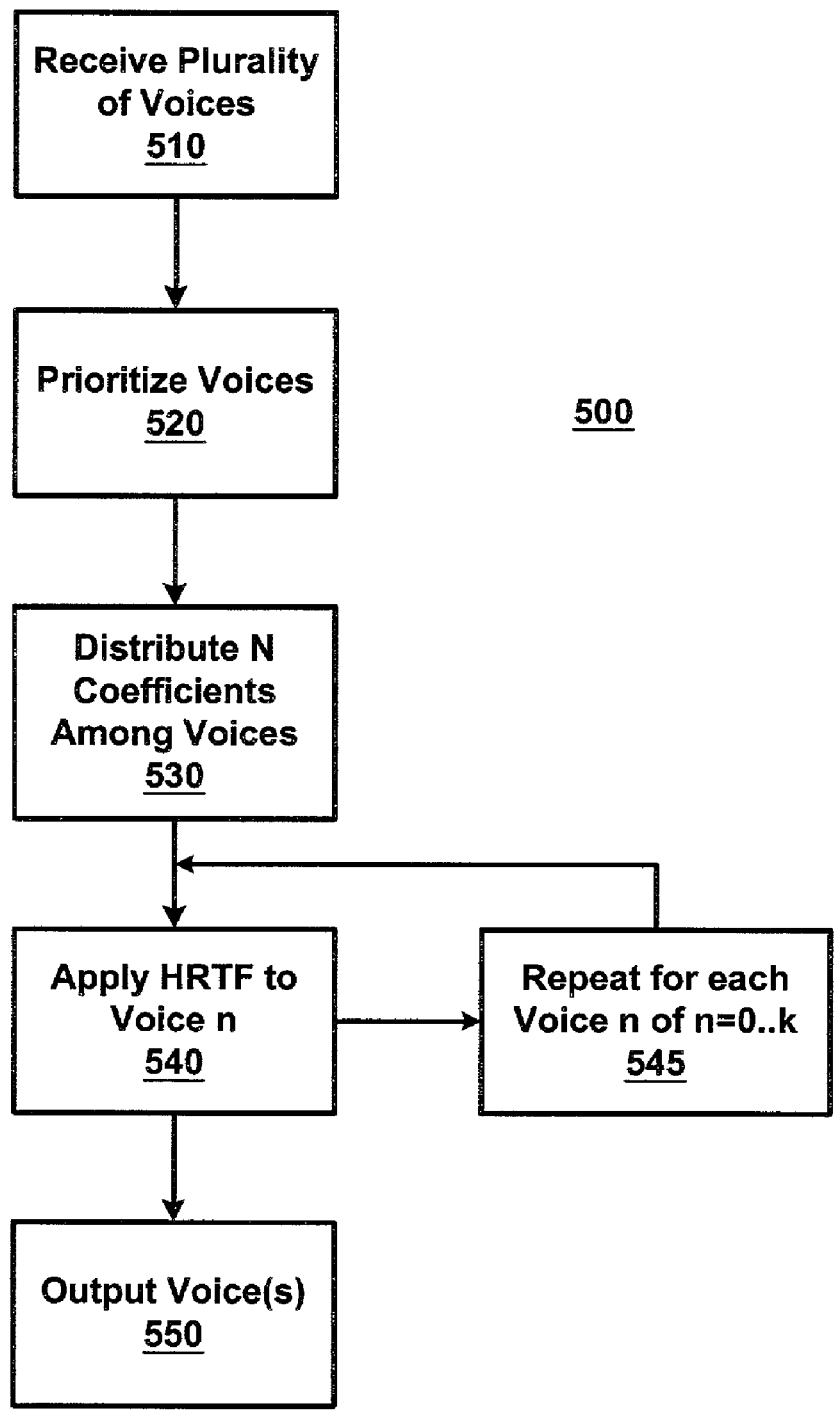
FIG. 5 is a flow diagram illustrating a method for localization of a sound using a Head Related Transfer Function according to at least one embodiment of the present invention.

Referring next to FIG. 5, a method for utilizing sound localization system 200 (FIG. 2) is illustrated according to at least one embodiment of the present invention. Method 500 initiates with step 510, wherein a plurality of voices (voices 211–218, FIG. 2) are received or retrieved by audio processing system 220 (FIG. 2) from audio data source 210 (FIG. 2). Voices 211–218 can be stored on a storage device, such as an optical disc or hard disc, stored in a buffer in memory, etc. Alternately, in one embodiment, some or all of voices 211–218 are transmitted from audio data source 210 to audio processing system 220 in an analog format. In this case, step 510 can also include the conversion of the voices 211–218 from an analog format to a digital format.

In step 520, voices 211–218 (FIG. 2), in one embodiment, are prioritized by prioritization module 230 based on a characteristic or property of each of the voices the audio type of each voice.

For example, those voices that would benefit more from the application of a HRTF for 3-D sound localization could be assigned a higher priority than those voices that would benefit less or none at all. Likewise, voices 211–218 could be prioritized based on other characteristics, such as the interpreted distance of each voice, the amount of data associated with each voice, the sample rate of each voice, and the like. Alternately, the priority of voices 211–218 could be dictated by audio data source 210. In this case, prioritization module 230 could prove unnecessary, and therefore, in one embodiment, is omitted from audio processing system 220.

In step 530, a fixed number (N) of coefficients are distributed among voices 211–218 by filter unit 240 (FIG. 2). For example, in one embodiment, filter unit 240 includes eight assignment modules 311 (FIG. 3), where each assignment module 311 has four channel inputs (corresponding to four voices) and each assignment module 311 can distribute up to 32 coefficients. Accordingly, in this example, the filter unit can distribute 264 coefficients (8 assignment modules ×32 coefficients/assignment module) among 32 voices (voices 211–218). As discussed previously, assignment modules 311, in one embodiment, assign coefficients among their associated voices based on a distribution scheme (distribution schemes 401–403), where the distribution scheme can be based on priority, sample rate, and the like.

In one embodiment, a HRTF is applied to voices 211–218 (FIG. 2) using FIR filter 320. Using equation 430 (FIG. 4), each voice of voice 211–218 is processed according to the number of coefficients assigned to the voice being processed. Recall that those voices (voices 211–218) that have zero coefficients, in one embodiment, are not processed by FIR filter 320. As discussed previously, in one embodiment, the number of coefficients assigned to a particular voice is directly proportional to the resulting precision of the 3-D sound localization afforded by the application of FIR filter 320, whereas the processing effort is generally inversely proportional. As a result, more processing effort/time can be used on those voices (voices 211–218) that are desired to have a greater accuracy than those voices that need less accuracy. Step 540 is repeated for a desired number of voices (voices 211–218). Each voice of voices 211–218 can be processed in its entirety, or a portion of each voice can be processed in sequence, and so on.

In step 550, the results of the processing of FIR filter 320 on voices 211–218 receive additional processing, if needed, and output. For example, the results could be combined by output interface 250 (FIG. 2) into a left channel (left output channel 282, FIG. 2) and a right channel (right output channel 283, FIG. 2), sample rate converted, and the like. The left and right channels could then be output to speakers 290, 295 (FIG. 2). Alternately, the output could be converted into an appropriate format and stored in a storage device, such as an optical disc.

The various functions and components in the present application may be implemented using a data processor, or a plurality of data processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

One of the implementations of the invention is as sets of computer readable instructions resident in the random access memory of one or more processing systems configured generally as described in FIGS. 1–5. Until required by the processing system, the set of instructions may be stored in another computer readable memory, for example, in a hard disk drive or in a removable memory such as an optical disk for eventual use in a CD drive or DVD drive or a floppy disk for eventual use in a floppy disk drive. Further, the set of instructions can be stored in the memory of another processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information. The preceding detailed description is, therefore, not to be taken in a limiting sense, and the scope of the present invention is defined only by the appended claims.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
    processing a first voice having a first characteristic to a first level of precision using a first finite impulse response filter, wherein the first level of precision is based on the first characteristic;
    processing a second voice having a second characteristic to a second level of precision, different from the first level of precision, using a second finite impulse response filter;
    wherein the first voice and the second voice are processed substantially in parallel;
    wherein the second level of precision is based on the second characteristic; and
    wherein a number of coefficients used by the first finite impulse response filter is different from a number of coefficients used by the second finite impulse response filter.

2. The method of claim 1, wherein the processing of the first voice and the second voice provides localization of the first voice and the second voice in three-dimensional space.

3. The method of claim 1, wherein the first characteristic includes a first interpreted distance and the second characteristic includes a second interpreted distance different from the first interpreted distance.

4. The method of claim 1, wherein the first characteristic includes a first audio type and the second characteristic includes a second audio type different from the first audio type.

5. The method of claim 1, wherein the first characteristic includes a first priority level and the second characteristic includes a second priority level different from the first priority level.

6. The method of claim 1, further including prioritizing the first voice and the second voice.

7. The method of claim 6, wherein the coefficients used by the finite impulse response filter are determined using a Head Related Transfer Function.

8. A method comprising:
    receiving a first voice data having a first characteristic;
    receiving a second voice data having a second characteristic, different from the first characteristic;
    assigning a first number of filter coefficients to the first voice data based on the first characteristic;
    assigning a second number of filter coefficients, different from the first number of coefficients, to the second voice data based on the second characteristic;
    processing the first voice data using a first finite impulse response filter, wherein a number of filter coefficients used by the first finite impulse response filter is equal to the first number of filter coefficients assigned to the first voice data; and
    processing the second voice data using a second finite impulse response filter, wherein a number of filter coefficients used by the second finite impulse response filter is equal to the second number of filter coefficients assigned to the second voice data, wherein the first voice data and the second voice data are processed substantially in parallel.

9. The method of claim 8, wherein the first characteristic and the second characteristic are determined prior to receiving the first voice data and the second voice data.

10. The method of claim 8, wherein the first characteristic and the second characteristic are determined subsequent to receiving the first voice data and the second voice data.

11. The method of claim 8, wherein the first characteristic includes a first interpreted distance and the second characteristic includes a second interpreted distance different from the first interpreted distance.

12. The method of claim 8, wherein the first characteristic includes a first audio type and the second characteristic includes a second audio type different from the first audio type.

13. The method of claim 8, wherein the first characteristic includes a first priority level and the second characteristic includes a second priority level different from the first priority level.

14. A method comprising:
assigning a first number of filter coefficients to a first voice having a first characteristic, wherein first number of coefficients is based on the first characteristic;
assigning a second number of filter coefficients to a second voice having a second characteristic different from the first characteristic, wherein second number of coefficients is based on the second characteristic and is different from the first number of filter coefficients, and where the sum of the first number of coefficients and the second number of coefficients is no greater than a predetermined fixed number of coefficients;
applying a first Head Related Transfer Function to the first voice, the first Head Related Transfer Function using a number of coefficients equal to the first number of coefficients assigned to the first voice; and
applying a second Head Related Transfer Function to the second voice, the second Head Related Transfer Function using a number of coefficients equal to the second number of coefficients assigned to the second voice, wherein the first Head Related Transfer Function and the second Head Related Transfer Function are applied substantially in parallel.

15. The method of claim 14, further including:
determining the first characteristic of the first voice; and
determining the second characteristic of the second voice.

16. The method of claim 14, wherein the first characteristic includes a first interpreted distance and the second characteristic includes a second interpreted distance different from the first interpreted distance.

17. The method of claim 14, wherein the first characteristic includes a first audio type and the second characteristic includes a second audio type different from the first audio type.

18. The method of claim 14, wherein the first characteristic includes a first priority level and the second characteristic includes a second priority level different from the first priority level.

19. The method of claim 14, wherein applying a Head Related Transfer Function is used to provide localization of sound in three-dimensional space.

20. A method comprising:
receiving a plurality of voices, wherein the plurality of voices is representative of a plurality of sound sources;
distributing a fixed number of coefficients among the plurality of voices, wherein a number of coefficients assigned to a voice is based on a priority associated with the voice; and
applying a Head Related Transfer Function to each voice of the plurality of voices using a finite impulse response filter, wherein the number of coefficients used by the finite impulse response filter to filter a voice is based on a number of the fixed number of coefficients distributed to the voice.

21. The method of claim 20, wherein the priority associated with a voice is determined prior to receiving the plurality of voices.

22. The method of claim 20, wherein the priority associated with a voice is determined subsequent to receiving the plurality of voices.

23. The method of claim 20, wherein the priority associated with a voice is based on an interpreted distance of the voice.

24. The method of claim 20, wherein the priority associated with a voice is based on an audio type of the voice.

25. The method of claim 20, wherein applying a Head Related Transfer Function is used to provide localization of sound in three-dimensional space.

26. The method of claim 20, wherein distributing a fixed number of coefficients includes:
assigning a number of the fixed number of coefficients each subgroup of a plurality of subgroups;
associating each of the plurality of voices with one of the plurality of subgroups; and
distributing, for each subgroup of the plurality of subgroups, the number of coefficients assigned to the subgroup among the voices associated with the subgroup.

27. A device comprising:
a processor;
memory operably coupled to said processor; and
a program of instructions capable of being stored in said memory and executed by said processor, said program of instructions to manipulate said processor to:
receive a first voice data having a first characteristic;
receive a second voice data having a second characteristic different from the first characteristic;
assign a first number of filter coefficients based on the first characteristic; and
assign a second number of filter coefficients, different from the first number of filter coefficients, based on the second characteristic;
process the first voice data using a first finite impulse response filter, wherein a number of filter coefficients used by the first finite impulse response filter is equal to the first number of filter coefficients assigned to the first voice data; and
process the second voice data using a second finite impulse response filter, wherein a number of filter coefficients used by the second finite impulse response filter is equal to the second number of filter coefficients assigned to the second voice data, wherein the first voice data and the second voice data are processed substantially in parallel.

28. The device of claim 27, wherein the first characteristic and the second characteristic are determined prior to receipt of the first voice data and the second voice data.

29. The device of claim 27, wherein the first characteristic and the second characteristic are determined subsequent to receipt of the first voice data and the second voice data.

30. The device of claim 27, wherein the first characteristic includes a first interpreted distance and the second characteristic includes a second interpreted distance different from the first interpreted distance.

31. The device of claim 27, wherein the first characteristic includes a first audio type and the second characteristic includes a second audio type different from the first audio type.

32. The device of claim 27, wherein the first characteristic includes a first priority level and the second characteristic includes a second priority level different from the first priority level.

33. A computer readable medium tangibly embodying a program of instructions, said program of instructions including instructions to manipulate a processor to:
receive a first voice data having a first characteristic;
receive a second voice data having a second characteristic different from the first characteristic;
assign a first number of filter coefficients based on the first characteristic;

assign a second number of filter coefficients, different from the first number of filter coefficients, based on the second characteristic;

process the first voice data using a first finite impulse response filter, wherein a number of filter coefficients used by the first finite impulse response filter is equal to the first number of filter coefficients assianed to the first voice data; and process the second voice data using a second finite impulse response filter, wherein a number of filter coefficients used by the second finite impulse response filter is euual to the second number of ifiter coefficients assigned to the second voice data, wherein the first voice data and the second voice data are processed substantially in parallel.

34. The computer readable medium of claim 33, wherein the first characteristic and the second characteristic are determined prior to receipt of the first voice data and the second voice data.

35. The computer readable medium of claim 33, wherein the first characteristic and the second characteristic are determined subsequent to receipt of the first voice data and the second voice data.

36. The computer readable medium of claim 33, wherein the first characteristic includes a first interpreted distance and the second characteristic includes a second interpreted distance different from the first interpreted distance.

37. The computer readable medium of claim 33, wherein the first characteristic includes a first audio type and the second characteristic includes a second audio type different from the first audio type.

38. The computer readable medium of claim 33, wherein the first characteristic includes a first priority level and the second characteristic includes a second priority level different from the first priority level.

* * * * *

UNITED STATES PATENT AND TRADEMARK OFFICE
CERTIFICATE OF CORRECTION

PATENT NO. : 7,079,658 B2 Page 1 of 1
APPLICATION NO. : 09/881863
DATED : July 18, 2006
INVENTOR(S) : Olivier D. Lapicque It is certified that error appears in the above-identified patent and that said Letters Patent is hereby corrected as shown below:

Column 15, Line 7: Change assianed to --assigned--

Column 15, Line 12: Change "euual" to --equal--

Column 15, Line 12: Change "ifiter" to --filter--

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,079,658 B2  
APPLICATION NO. : 09/881863  
DATED : July 18, 2006  
INVENTOR(S) : Olivier D. Lapicque It is certified that error appears in the above-identified patent and that said Letters Patent is hereby corrected as shown below:

Column 15, Line 7: Change assianed to --assigned--

Column 15, Line 12: Change "euual" to --equal--

Column 15, Line 12: Change "ifiter" to --filter--

This certificate supersedes Certificate of Correction issued December 12, 2006.

Signed and Sealed this

Ninth Day of January, 2007

JON W. DUDAS  
*Director of the United States Patent and Trademark Office*